A. EMMERT.
DISK HARROW.
APPLICATION FILED JUNE 17, 1911.
1,092,249.
Patented Apr. 7, 1914.
2 SHEETS—SHEET 1.
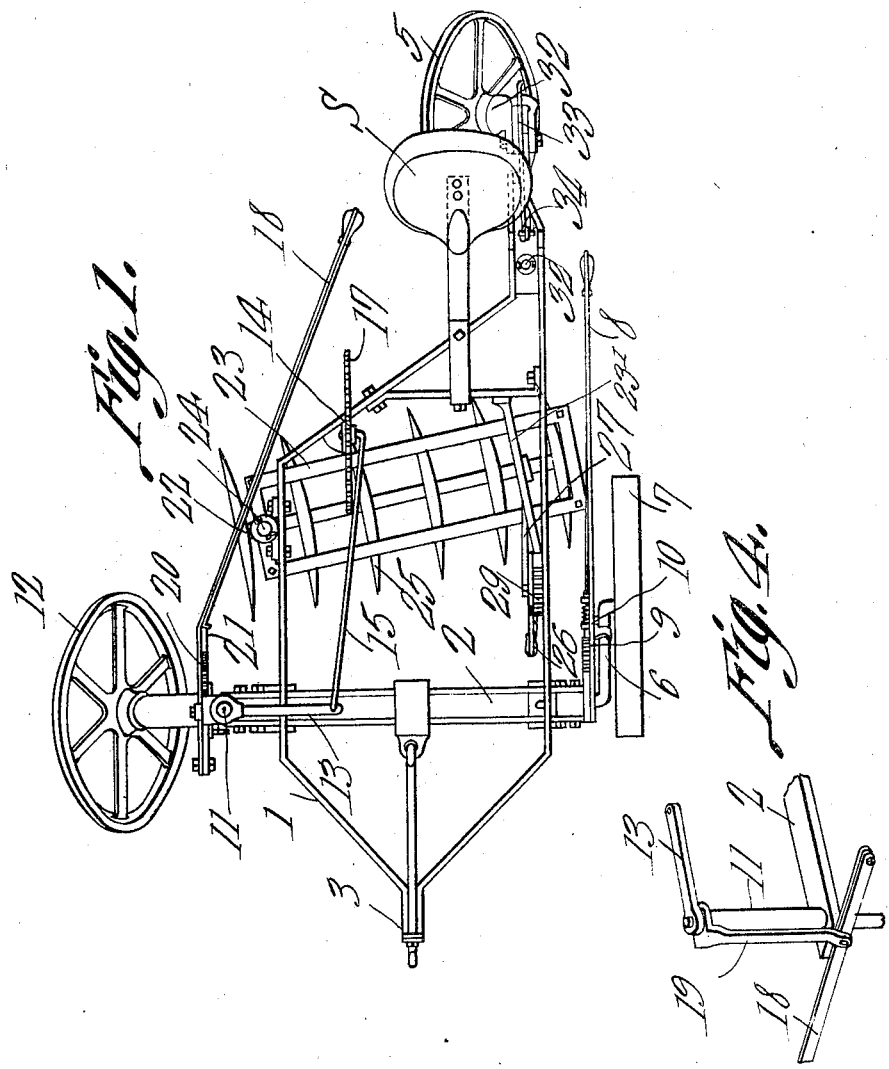
Albert Emmert,
Inventor
by C.A. Snow & Co.,
Attorneys
Witnesses

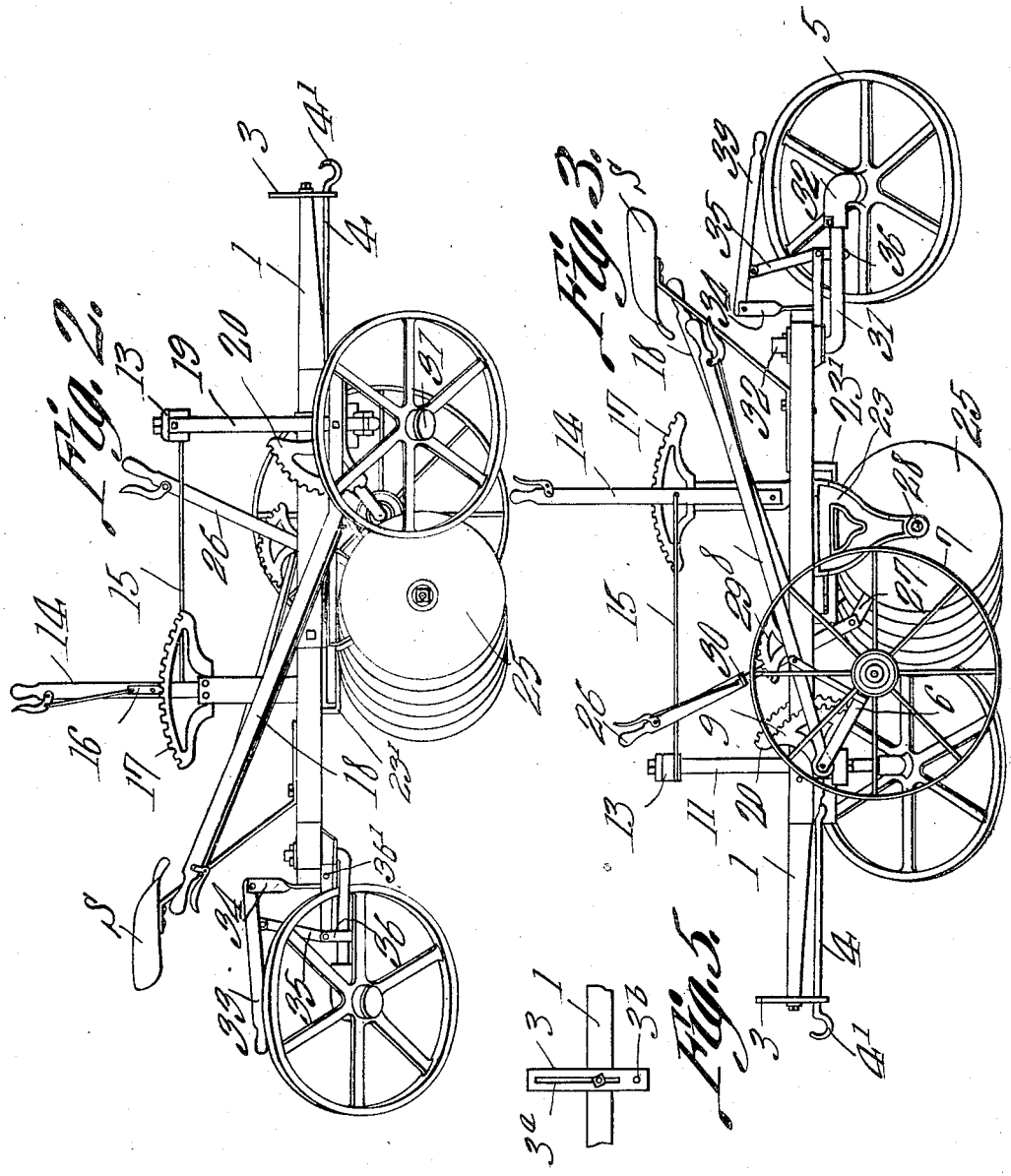

UNITED STATES PATENT OFFICE.

ALBERT EMMERT, OF CORPUS CHRISTI, TEXAS.

DISK HARROW.

1,092,249.  Specification of Letters Patent.  Patented Apr. 7, 1914.

Application filed June 17, 1911.  Serial No. 633,735.

*To all whom it may concern:*

Be it known that I, ALBERT EMMERT, a citizen of the United States, residing at Corpus Christi, in the county of Nueces and State of Texas, have invented a new and useful Disk Harrow, of which the following is a specification.

This invention relates to disk harrows and consists in the novel construction and arrangement of its parts as hereinafter described and claimed.

The object of the invention is to provide a harrow consisting of a wheel mounted frame with means for raising and lowering the opposite sides thereof independently together with a frame pivotally attached thereto and carrying a gang of harrow disks with means for swinging one end portion of the last mentioned frame with relation to the wheel mounted frame.

In the accompanying drawing: Figure 1 is a top plan view of the harrow. Fig. 2 is a side elevation viewing the same from one side. Fig. 3 is a side elevation viewing the same from the side opposite to that at which it is viewed in Fig. 2. Fig. 4 is a detail perspective of a portion of the harrow. Fig. 5 is a front elevation of the guide provided for the draft bar.

The harrow consists of a frame 1 which is provided with a cross bar 2. The sides of the frame converge forwardly from this bar 2 and a guide plate 3 is bolted to the front end of the frame, the bolt extending through a longitudinal slot 3ª whereby the plate can be tilted laterally or slid upwardly or downwardly. An opening 3ᵇ is formed in the lower end portion of the slot and receives a draft bar 4 secured at its back end to bar 2 and provided with a hook 4' at its front end. This construction enables the line of draft to be varied at will. An operator's seat S is mounted upon the rear portion of the frame 1, said portion being supported upon a caster wheel 5, as hereinafter set forth. A crank arm 6 is pivoted to one end of the cross bar 2 and a ground wheel 7 is journaled upon one end of the arm 6. A lever 8 is fixed at one end to the crank arm 6 and a gear segment 9 is mounted upon the frame 1. The lever 8 is provided with a spring pawl 10 which is adapted to engage the teeth of the segment 9. As the lever 8 is swung vertically the said arm 6 is turned at the end of the cross bar 2 and thus the lower portion of the arm 6 is raised or lowered which in turn will raise or lower the side portion of the frame 1 at which the said arm 6 is located. A shaft 11 is journaled for rotation in a vertical bearing provided at the opposite end of the cross bar 2 from that end at which the wheel 3 is located and a wheel 12 is journaled for rotation at the lower end of the shaft 11. The plane of the wheel 12 is at an angle to the surface of the ground. A steering arm 13 is fixed to the upper end of the shaft 11, a lever 14 is fulcrumed upon the rear side of the frame 1 and a rod 15 operatively connects the said lever with the inner end of the steering arm 13. Thus it will be seen that by swinging the lever 14 the rod 15 will be moved longitudinally and the steering arm 13 will be turned about the axis of the shaft 11. The said wheel 12 may be pitched at a desired angle with relation to the line of draft of the implement and when it is in a desired position may be so secured by permitting the pawl 16 carried by the lever 14 to engage the teeth 17 of the adjacent segment plate. A lever 18 is fulcrumed at the end of the cross bar 2 and is provided with a link 19 the upper end of which connects with the arm 13 in the vicinity of the end thereof which is attached to the upper end of the shaft 11. A gear segment 20 is mounted at the end of the cross bar 2 and the lever 18 is provided with a spring pawl 21 which is adapted to engage the teeth of the segment 20 whereby the said lever 18 is held in an adjusted position. Thus by swinging the lever 18 the connecting link 19 will move the shaft 11 longitudinally in its bearing at the end portion of the cross bar 2 and therefore the wheel 12 journaled at the lower end of the said shaft will be raised or lowered and by this means provision is made for raising and lowering the forward portion of the frame 1 and the opposite side thereof from the wheel 7. The frame 1 is provided upon its rear side with a bearing 22 having a vertically disposed opening. A frame 23 is slidably mounted at one end in a guide 23' and is provided at its other end with a vertically disposed pin 24 which is journaled in the opening of the bearing 22. A series of harrow disks 25 is journaled upon a shaft 28 mounted in the lower end of the frame 23. A lever 26 is fulcrumed at the side of the frame 1 opposite the side thereof away from that side adjacent which is located the bearing 22. A yoke or rod 27 is pivotally connected at one end with the lever 26 and at its other end is pivotally connected with the free end of the shaft 28 upon which the harrow disks 25 are journaled.

A gear segment 29 is mounted upon the side of the frame 1 adjacent the lever 26 and the said lever is provided with a spring pawl 30 which is adapted to engage the teeth of the segment 29. Therefore it will be seen that when the lever 26 is swung the free end portion of the shaft 28 will be correspondingly moved and thus means is provided for presenting the disks 25 to the soil at a desired angle with relation to the line of draft. When the disks have been properly positioned as indicated they are held in adjusted position by means of permitting the spring pawl 30 carried by the lever 26 to engage the teeth of the gear segment 29.

As shown in the drawings the caster wheel 5 may be connected to the machine by a crank axle 31 one end or bearing portion 32 of which is inclined upwardly away from the wheel side of the machine, the upper bearing portion 32 being substantially vertical and journaled in frame 1. A lever 33 is fulcrumed on a standard 34 and is connected by a link 35 to an L-shaped dog 36 adapted to extend to one side of axle 31 and hold it against movement in one direction. This dog is pivoted to the frame 1, as indicated at 36'. When, however, it is desired to turn the machine to the right the dog 36 can be raised, thus releasing the axle 31. The standard 34 coöperates with the pivot end of lever 33 in any suitable manner to limit the downward swinging movement of the lever.

It will be seen that the harrow may be raised or lowered independently at either side in order to make the harrow members at either side of the machine cut to a greater or less extent below the surface of the soil as desired. Also means is provided for shifting the entire gang of harrow members in order that they may be presented to the soil at a proper angle with relation to the line of draft and in order to overcome a tendency to side draft by shifting the position or relative angle of the harrow disks 25 with relation to the line of draft, the wheel 12 may be varied in its angular position with relation to the line of draft. That is to say that when the harrow disks 25 are disposed at one angle to the line of draft, the wheel 12 may be disposed at an angle in the opposite direction or approximately so. This will neutralize the tendency to side draft in both lateral directions of the line of draft of the machine and will enable the harrow disks 25 to properly operate upon the surface of the soil.

Having described my invention what I claim as new and desire to secure by Letters Patent is:—

In a harrow, a main frame, a crank axle mounted to swing laterally under and connected to a portion of the main frame, the rear end portion of the axle being inclined downwardly and laterally, a caster wheel supported by said rear end portion, an L-shaped dog pivotally connected to the main frame and adapted to swing downwardly into position at one side of the crank axle to hold said axle against lateral movement in one direction relative to the frame, a lever, and a link connection between the lever and the angle portion of the dog for lifting the dog out of engagement with the axle, said dog normally engaging the axle at a point remote from the axis of rotation of the axle.

In testimony that I claim the foregoing as my own, I have hereto affixed my signature in the presence of two witnesses.

ALBERT EMMERT.

Witnesses:
  PAT WHALEN, Jr.,
  F. J. ONZON.